United States Patent Office 3,246,042
Patented Apr. 12, 1966

3,246,042
PREPARATION OF TRICHLOROALKANES
Yanosuke Inaba, Fujisawa, Kanagawa, and Goro Kimura and Kosuke Yamamoto, Kamakura, Kanagawa, Japan, assignors to Toyo Koatsu Industries, Inc., Tokyo, Japan, a corporation of Japan
No Drawing. Filed Oct. 11, 1962, Ser. No. 230,004
Claims priority, application Japan, Nov. 6, 1961,
36/39,491
5 Claims. (Cl. 260—657)

This invention relates to processes for the preparation of trichloroalkanes having the formula

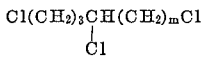

wherein $m$ is an integer from 1 to 6 from alpha-tetrahydrofuryl alkylchlorides having the formula

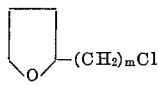

wherein $m$ is as defined above.

It is an object of this invention to provide a process by which trichloroalkanes can be produced in high yield and with ease from alpha-tetrahydrofuryl alkylchlorides.

The process of the present invention comprises heating an alpha-tetrahydrofuryl alkylchloride and hydrogen chloride as shown in Equation 1 in an atmosphere of gas which is inert to the reaction, such as, nitrogen, hydrogen, carbon dioxide, carbon monoxide and argon, at 70–115° C. in the presence of more than one mol of water per mol of alpha-tetrahydrofuryl alkylchloride, in the presence of a metal chloride, such as, zinc chloride, ferrous chloride, ferric chloride, aluminum chloride, stannous chloride, and stannic chloride, sulfuric acid or mixtures thereof as a catalyst to obtain a trichloroalkane.

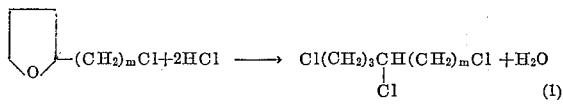

A detailed explanation will be made hereinafter as to the effects such conditions as different temperatures, the presence or absence and quantity of water, have upon the amounts of ring-opening reaction products produced in the case of reacting alpha-tetrahydrofuryl alkylchloride with hydrogen chloride, employing metal chlorides such as zinc chloride, ferrous chloride, ferric chloride, aluminum chloride, stannous chloride, stannic chloride, etc. and sulfuric acid or mixtures thereof as a catalyst.

As shown in Equation 2 below chlorohydrin derivatives are produced in an initial stage of the reaction of alpha-tetrahydrofuryl alkylchloride with hydrogen chloride.

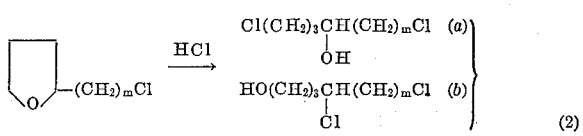

In general, the principal component of the derivatives (a) and (b) in Equation 2 comprises the (a) type compound. Since these chlorohydrin derivatives are sensitive to heat, they are capable of producing various undesired compounds. For example, in the absence of water in the reaction system, even at 70–115° C., a portion of the chlorohydrin derivatives of the types (a) and (b) in Equation 2 is converted back to the starting material alpha-tetrahydrofuryl alkylchloride by dehydrochlorination as shown in Equation 3. A portion of the remaining chlorohydrin derivatives is converted to polychloro compounds of the ether type (c) and (d) as shown in Equation 4 or alpha,omega-dichloroolefin (e) and (f) as shown in Equation 5 by intermolecular dehydration reaction.

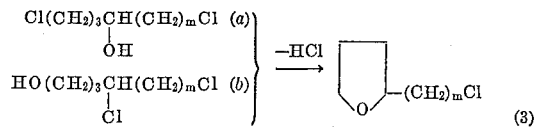

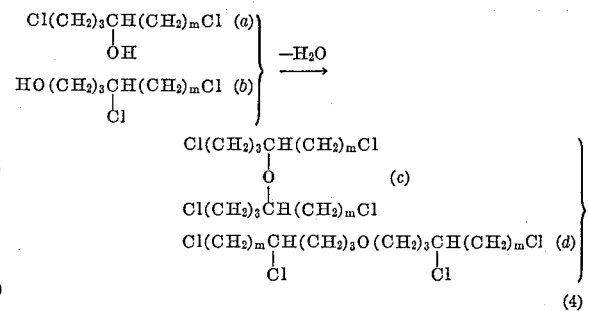

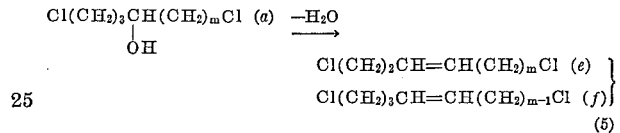

Reaction either in the presence of, or by introducing, an excessive amount of hydrogen chloride in the reaction system inhibits the dehydrochlorination shown in Equation 3. In this case too, however, the dehydration shown in Equations 4 and 5 also takes place and produces about 15% of the polychloro compounds of the ether type (c) and (d) and about 5% of alpha,omega-dichloroolefin compounds (e) and (f) as undesired by-products.

As a result of various attempts to prevent the dehydration reaction shown in Equation 4, it was discovered that complete prevention can be accomplished by conducting the reaction in the presence of water in the ratio of more than 1 mol to 1 mol of the alpha-tetrahydrofuryl alkylchloride starting material employed in the initial reaction system and maintaining the reaction temperature at 70–115° C. On the other hand, heating at this temperature range in the presence of water in the ratio of 1 mol or less to 1 mol of alpha-tetrahydrofuryl alkylchloride causes the side reaction set forth in Equation 4.

Maintaining the temperature of the reaction at 120–140° C. or higher, either in the presence or absence of water, causes the simultaneous reactions set forth in Equations 4 and 5. That is to say, in the absence of water or in the presence of water at the ratio of 1 mol or less to 1 mol of alpha-tetrahydrofuryl alkylchloride, heating at 120–140° C. or higher temperatures results in the formation of more than 35% of the polychloro compounds of the ether type (c) and (d) and about 10% of alpha,omega-dichloroolefin (e) and (f) as undesired by-products, and in decreasing the yield of the desired trichloroalkane to less than 55%. In the presence of water at the ratio of more than 1 mol to 1 mol of alpha-tetrahydrofuryl alkylchloride, heating at 120–140° C. or higher temperatures yields about 20% of the polychloro compounds of the ether type (c) and (d) and about 30% of alpha,omega-dichloroolefin (e) and (f) as undesired by-products.

Accordingly, the presence of more than one mol of water to 1 mol of alpha-tetrahydrofuryl alkylchloride and regulation of the reaction temperature is necessary for high yields of trichloroalkanes from the hydrochlorination of alpha-tetrahydrofuryl alkylchlorides.

It has been found, when alpha-tetrahydrofuryl alkylchloride is reacted with hydrochloric acid in an open vessel, that oxidation is accelerated by the presence of air to result in 20% of alpha,omega-dichloropropyl alkylketone and a decrease in the yield of the desired trichloroalkane. It is preferable, therefore, to conduct the reaction in a closed vessel or in an atomsphere of gas inert to the reaction, such as, nitrogen, hydrogen, carbon dioxide, carbon monoxide or argon, etc.

The reaction time according to this invention is governed by the kinds and amounts of catalysts employed. As an example, the required reaction time for obtaining 1,4,7-trichloroheptane at a yield of 95% in reacting alpha-tetrahydrofuryl-3-propylchloride with hydrogen chloride at 70–115° C. in the presence of water at the ratio of 2 mols per mol in alpha-tetrahydrofuryl-3-propylchloride is about 40 hours with 0.1 mol of zinc chloride; about 20–30 hours with 0.2 mol of zinc chloride; about 5–10 hours with 0.5 mol of zinc chloride. The reaction time can be shortened as the quantity of the catalyst is increased. In general, the preferred amounts of catalyst employed range from 0.1 to 1 mol of catalyst per mol of alpha-tetrahydrofuryl alkylchloride.

The process will be further illustrated in conjunction with the following specific examples. It should be understood, however, that the examples are given for the purpose of illustration and not by way of limitation.

*Example 1*

A mixture of 149 g. of alpha-tetrahydrofuryl-3-propylchloride, 60 g. of zinc chloride and 45 g. of water was introduced into a reactor, in which air had been substantially replaced by nitrogen gas, having an agitator, a reflux condenser, an inlet pipe for hydrogen chloride and a thermometer. Hydrogen chloride was passed for 15 hours into the mixture which was heated at 80–85° C. during this period of time. After cooling the mixture, an oil layer was separated. The oil layer was washed with water, neutralized, dried and rectified to obtain 191 g. (94% yield) of 1,4,7-trichloroheptane.

*Example 2*

A mixture of 149 g. of alpha-tetrahydrofuryl-3-propylchloride, 15 g. of zinc chloride and 18 g. of water was charged into the same apparatus described in Example 1 and air was substantially eliminated from the reaction system by passing nitrogen gas through it. For 35 hours hydrogen chloride was slowly passed into the mixture which was heated at 120–130 C. during this period of time.

After the completion of the reaction, an oil layer was separated, washed with water, neutralized, dried and rectified to obtain 5 g. of 1,7-dichloroheptene-(3) (boiling point 92–96° C./12 mm. Hg, specific gravity $d_4^{30}$ of 1.0596), 106 g. of 1,4,7-trichloroheptane (boiling point 105–108° C./6 mm. Hg, specific gravity $d_4^{30}$ of 1.1834), and 78 g. of a high boiling substance (polychloro compound of the ether type). The yield of 1,4,7-trichloroheptane was 52%. Thus, when the reaction is carried out at 120–130° C., as aforesaid, a large amount of polychloro compound of ether type is produced, resulting in a decreased yield of the desired product.

*Example 3*

A mixture of 149 g. of alpha-tetrahydrofuryl-3-propylchloride, 15 g. of zinc chloride and 27 g. of water was introduced into a reactor provided with an agitator, a reflux condenser, an inlet pipe for hydrogen chloride, an inlet pipe for inert gas and a thermometer. The mixture was heated to 80–85° C. while air in the reactor was eliminated by introducing a mixed gas of hydrogen and nitrogen. Hydrogen chloride was passed into the mixture at this temperature for 40 hours. After separation of the oil layer that formed on cooling the reaction mixture, it was washed with water, neutralized, dried and rectified to obtain 10 g. of 1,7-dichloroheptene-(3) and 175 g. (86% yield) of 1,4,7-trichloroheptane.

*Example 4*

177 g. of alpha-tetrahydrofuryl-5-amylchloride, 59 g. of crystallized aluminum chloride, 20 g. of stannic chloride and 35 g. of water were put into a reactor equipped with an agitator, a reflux condenser, a gas inlet pipe and a thermometer. The mixture was heated to 90–105° C. while the air in the reactor was expelled by the introduction of hydrogen gas. Hydrogen chloride was passed into the mixture at this temperature for 30 hours and the oil layer formed was treated by the same method as described in Example 3 to obtain 210 g. (91% yield) of 1,4,9-trichlorononane.

*Example 5*

Carbon dioxide gas was passed into a reactor provided with an agitator, a reflux condenser, a gas inlet pipe and a thermometer. A mixture of 177 g. of alpha-tetrahydrofuryl-5-amylchloride, 150 g. of 30% sulfuric acid and 100 g. of 35% hydrochloric acid was charged to this reactor and while hydrogen chloride was being passed into the mixture for 40 hours the latter was heated at 100–115° C. After cooling the mixture, an oil layer was separated. The layer of the aqueous solution was extracted twice with ether. The oil layer and the extracted liquor were combined, washed with water, neutralized, dried and rectified to obtain 43 g. of 1,9-dichlorononene, 169 g. of 1,4,9-trichlorononane and 10 g. of a high boiling substance.

*Example 6*

Nitrogen gas was introduced into a reactor provided with an agitator, a reflux condenser, a gas inlet pipe and a thermometer. 177 g. of alpha-tetrahydrofuryl-5-amylchloride, 20 g. of stannous chloride, 20 g. of stannic chloride and 400 g. of 35% hydrochloric acid solution were charged to the reactor. The mixture in the reactor was heated at 90–95° C. for 30 hours and the oil layer which formed on cooling was separated, washed with water, neutralized, dried and rectified to obtain 210 g. (91% yield) of 1,4,9-trichlorononane.

While this invention has been described with reference to trichloroalkanes, it is equally applicable in substantially all respects to the manufacture of any trihaloalkane from the corresponding alpha-tetrahydrofuryl alkylhalide and hydrogen halide, e.g., tribromoalkane from the corresponding alpha-tetrahydrofuryl alkylbromide and hydrogen bromide.

The trihaloalkanes produced by this invention are useful as starting materials for the production of alkane triols by reaction of said trihaloalkanes with an alkali metal base, for example. The triols in turn are reactive with such monomers as polyepoxides or polycarboxylic acids to form solid resins useful in the manufacture of a variety of articles, such as, buttons, comb and brush handles, door knobs, window sills, light switches and the like. The trihaloalkanes can also be dehydrohalogenated to produce olefinically unsaturated, chlorine-substituted compounds which are polymerizable, e.g., in the presence of peroxide catalysts, to form resinous materials which can be employed as protective coatings or plastic films.

What is claimed is:

1. Process for the manufacture of a trichloroalkane comprising reacting hydrogen chloride with alpha-tetrahydrofuryl alkylchloride in the presence of more than one mol of water per mol of alpha-tetrahydrofuryl alkylchloride, in the presence of from 0.1 to 1 mol per mol of alpha-tetrahydrofuryl alkylchloride of a catalyst from the class consisting of zinc chloride, ferrous chloride, ferric chloride, aluminum chloride, stannous chloride, stannic chloride, sulfuric acid and mixtures thereof, in the absence of oxygen, and at a temperature of about 70 to about 115° C. to form said trichloroalkane.

2. Process for making 1,4,7-trichloroheptane as claimed in claim 1 wherein said alpha-tetrahydrofuryl alkylchloride is alpha-tetrahydrofuryl-3-propylchloride and said catalyst is zinc chloride.

3. Process for making 1,4,9-trichlorononane as claimed in claim 1 wherein said alpha-tetrahydrofuryl alkylchloride is alpha-tetrahydrofuryl-5-amylchloride and said catalyst is a mixture of aluminum chloride and stannic chloride.

4. Process for making 1,4,9-trichlorononane as claimed in claim 1 wherein said alpha-tetrahydrofuryl alkylchloride is alpha-tetrahydrofuryl-5-amylchloride and said catalyst is sulfuric acid.

5. Process for making 1,4,9-trichlorononane as claimed in claim 1 wherein said alpha-tetrahydrofuryl alkylchloride is alpha-tetrahydrofuryl-5-amylchloride and said catalyst is a mixture of stannous chloride and stannic chloride.

References Cited by the Examiner

UNITED STATES PATENTS

| | | | |
|---|---|---|---|
| 2,218,018 | 10/1940 | Cass | 260—657 |
| 2,852,532 | 9/1958 | Hamel | 260—657 |
| 2,889,380 | 6/1959 | Hamel | 260—657 |

OTHER REFERENCES

Amstutz et al.: J. Am. Chem. Soc. 63, 206–207 (1941).
Burger et al.: J. Chem. Soc. (London), 1937, 718–25.
Wilson: J. Chem. Soc. (London), 1945, 48–51.

LEON ZITVER, *Primary Examiner.*

DANIEL D. HORWITZ, *Examiner.*